Patented Apr. 21, 1931

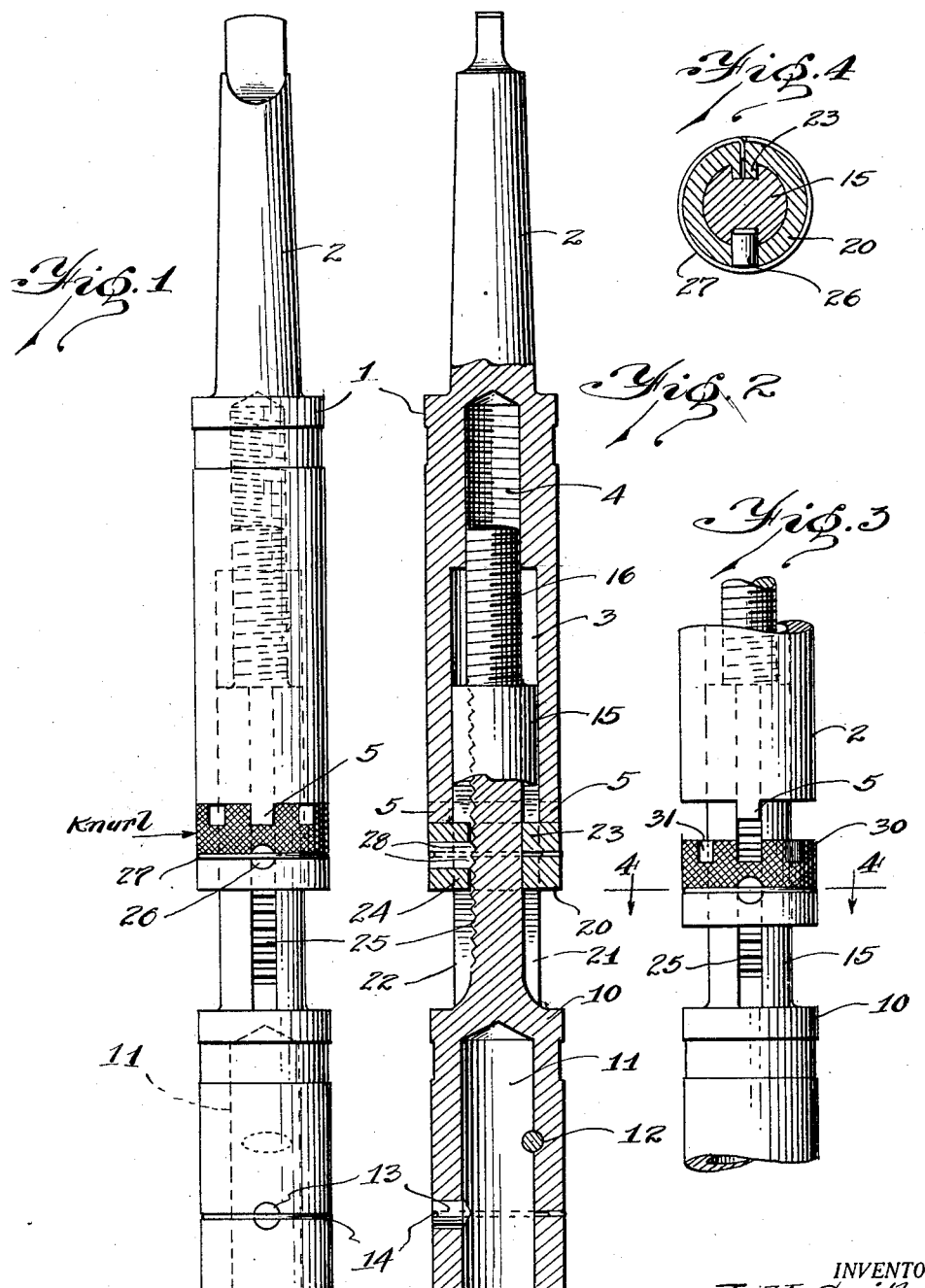

1,801,883

UNITED STATES PATENT OFFICE

JOHN H. SMITH, OF DETROIT, MICHIGAN, ASSIGNOR TO WESSON SALES CO., OF DETROIT, MICHIGAN, A CORPORATION OF MICHIGAN

ADJUSTABLE BORING BAR

Application filed September 17, 1928. Serial No. 306,350.

This invention relates to an adjustable boring bar which is useful in a drill press, lathe, milling machine, or the like, and which is especially advantageous for use in a drill press, employing multiple drills.

The invention is not limited to use in a multiple drill press, but its advantages can be nicely brought out by reference to such a press. In such a press there are a number of drills which may function simultaneously upon a piece of work. Ordinarily a drill press is provided with adjustments common to all drills, but variations may arise in the individual drills or boring bars or tool heads. For example, it may be desirable to have each and every drill positioned precisely the same, or in certain fixed relation to one another, but one or more drills may be shorter than the others by reason of long use and resharpening, and by employing the boring bar of this invention long or short drills, taps or other cutting tools can be quickly and easily adjusted by an operator so that the working ends of all are positioned the same, or in given relation to one another.

In the accompanying drawings:

Fig. 1 is a side elevational view of a boring bar constructed in accordance with the invention.

Fig. 2 is a view taken at right angles to Fig. 1, illustrating in cross-section some of the structural features of the bar.

Fig. 3 is a side elevation illustrating some of the parts in position for adjustment.

Fig. 4 is a cross-sectional view taken on line 4—4 of Fig. 3.

The boring bar of this invention consists essentially of two relatively adjustable members, one of which is adapted to be received and held in a suitable tool head, chuck, or other holder upon the lathe, drill press, or milling machine, and the other of which is adapted to hold the tool, whether it be a drill, tap, reamer, or the like.

In the accompanying drawings the boring bar will be seen to consist of one member 1 having a tapered end 2, adapted to be held in a complemental tool head. The particular shape of the part 2 has nothing to do with the present invention, inasmuch as the tool may be arranged to be held in various manners. This part 1 is formed with a socket 3, the inner end of which is screw-threaded as illustrated at 4, and which is preferably reduced in size as compared to the socket part 3. The lower end of part 1 is provided with suitable devices for the purpose of locking the same against relative rotation as regards another member, and for this purpose the member 1 may be provided with diametrically opposed keys, or lugs 5, integral with the body of the member.

The tool holding member is referenced 10, and has a socket 11 for the reception of a tool such as a drill, tap, reamer, or the like. A pin 12 projects into the socket in a conventional manner for holding the tool against rotation therein, and a locking pin 13 acted upon by spring 14 may be provided for frictionally engaging a recess in the tool for holding the same in socket 11. This socket arrangement for holding the tool, however, is conventional and needs no further detailed discussion.

The member 10 is connected to the member 1 so that the two are capable of relative adjustment but so that they are locked against relative rotational movement when assembled in operative position. Accordingly, the member 10 has a shank 15 adapted to fit in socket 3, and the end of the shank is reduced and screw-threaded as at 16 for a screw engagement with threads 4. It will be seen that when the two parts are rotated relative to each other member 10 is advanced or retracted as regards the member 1 by the screw-thread engagement.

It is necessary, however, to lock the tool against relative rotational movement, and for this purpose a sleeve 20 is positioned on the shank 15. The shank 15 has diametrically opposed longitudinally extending slots, or key-ways, 21 and 22, and the sleeve 20 has keys 23 and 24 slidable in the key-ways and which hold the sleeve and member 10 locked against relative rotational movement.

The sleeve, however, is capable of vertical sliding movement upon the shank 15, and for the purpose of holding the sleeve in any position in which it is left, the bottom of one of the key-ways is toothed or serrated as at 25, while the sleeve has an aperture therein in which rests a plunger 26. A suitable spring 27 engages the top of the plunger 26 and urges it inwardly so that the pointed end of plunger engages the serrations 25. The end of the plunger is provided with one or more points, or teeth 28, which complementally engage the serrations. Accordingly it will be observed that the sleeve can be manually moved vertically on the shank 15, during which time the pin 26 rides along over the serrations of the shank, with the pin moving in and out, which is permitted by the action of the spring 27. However, when the sleeve is released it remains in position.

As perhaps best illustrated in Fig. 3, the sleeve is provided with a formation for engaging the keys 5, on member 1. This formation advantageously consists of alternating projections 30 and recesses 31, with the recesses 31 arranged to nicely receive the keys 5.

With the parts in position as shown in Fig. 1, the sleeve is locked to the member 1 by reason of the keys 5 being engaged in recesses 31, and inasmuch as the sleeve is keyed to the member 10 the two parts 1 and 10 are locked together. To make adjustment, however, the operator can, by the use of one hand, pull the sleeve down upon the shank 15 until it is in a position approximating that of Fig. 3. At this time the operator can rotate the sleeve, which in turn rotates member 10 so that that member is fed lengthwise as regards the member 1 upon the screw-thread connection. The operator may turn the member 10 by direct operation thereon, which would effect the same result. When the tool in the socket 11 has thus been properly adjusted the sleeve is pushed back to the position shown in Fig. 1, and the several parts of the boring bar are again locked together. Preferably the sleeve is knurled on its exterior surface so that it may be easily grasped and moved lengthwise on the shank or rotated.

It will be noted that the driving connection, which is established by the lugs 5 fitting into recesses 31, is such as to provide a drive which can be used with tools which may be turned over to the right or to the left. This is advantageously carried out by forming the lugs and recesses square, but of course, other forms can be used so long as the drive is equally positive regardless of right or left rotation.

Claims:

1. A boring bar comprising in combination a member adapted to be held and actuated by a tool head or the like, another member for holding a tool, one of said members having a socket and the other having a shank which fits within the socket, a screw-threaded engagement between the socket and shank which permits adjustment by relative rotation, a slidable element keyed to one member, engaging means between said slidable element and the other of said members for locking the said member and sliding element against relative rotation, and means for holding said slidable element in any position in which it may be left upon the member upon which it is mounted.

2. A boring bar comprising in combination a member adapted to be held and actuated by a tool head or the like, said member being provided with a socket with interior threads, a second member for holding a tool having a shank adapted to be received in the socket and provided with threads for engaging the threads in the socket, such shank being provided with a key-way, a thimble on the shank having a key portion in the key-way, a projection on the first mentioned member, said thimble being slidably mounted upon the shank and provided with recesses for engaging the said projection to lock the members and thimble together against relative rotational movement.

3. A boring bar comprising in combination a member adapted to be held and actuated by a tool head or the like, said member being provided with a socket with interior threads, a second member for holding a tool having a shank adapted to be received in the socket and provided with threads for engaging the threads in the socket, such shank being provided with a key-way, a thimble on the shank having a key portion in the key-way, a projection on the first mentioned member, said thimble being slidably mounted upon the shank and provided with recesses for engaging the said projection to lock the member and thimble together against relative rotational movement, serrations on the tool holding member, and a spring pressed plunger carried by the thimble which engages the serrations to hold said thimble in any position in which it may be left.

4. A boring bar comprising in combination a member adapted to be held and actuated by a tool head or the like, another member for holding a tool, one of said members having a socket and the other having a shank which fits within the socket, a screw-threaded engagement between the socket and shank which permits adjustment by relative rotation, a slidable element keyed to one member, and one or more inter-engaging square-like projections and recesses in the slidable element and the other of said members for locking said member and slidable element against relative rotational movement, and friction means for automatically holding the slidable element from sliding relative to the member upon which it is mounted.

5. A boring bar comprising in combination a member adapted to be held and actuated by a tool head or the like, another member for holding a tool, one of said members having a socket and the other having a shank which fits within the socket, a screw-threaded engagement between the socket and shank which permits adjustment by relative rotation, a slidable element keyed to one member, a plurality of projections generally of a square formation, a plurality of notches in which the projections are adapted to fit, said projections and notches being one on the slidable elements and the other on the said other member so that said member and element are locked against rotational movement when the projections and notches inter-engage, and a spring pressed plunger for normally holding the sliding element from sliding.

6. A boring bar comprising in combination a member adapted to be held and actuated by a tool head or the like, another member for holding a tool, one of said members having a socket and the other having a shank which fits within the socket, a screw-threaded engagement between the socket and shank which permits adjustment by relative rotation, a slidable element keyed to one member, a plurality of projections generally of a square formation, a plurality of notches in which the projections are adapted to fit, said projections and notches being one on the slidable element and the other on the said other member so that said member and element are locked against rotational movement when the projections and notches inter-engage, and spring means for frictionally holding the slidable element in verious positions of adjustment on the member to which it is keyed.

In testimony whereof I have affixed my signature.

J. HUGO SMITH.